US012698811B2

(12) United States Patent
Gapin et al.

(10) Patent No.: US 12,698,811 B2
(45) Date of Patent: Aug. 4, 2026

(54) BRAKED AIRCRAFT WHEEL

(71) Applicant: SAFRAN LANDING SYSTEMS,
Velizy Villacoublay (FR)

(72) Inventors: Arnaud Gapin, Velizy (FR); Julien Marques, Velizy (FR)

(73) Assignee: SAFRAN LANDING SYSTEMS,
Velizy Villacoublay (FR)

( * ) Notice: Subject to any disclaimer, the term of this patent is extended or adjusted under 35 U.S.C. 154(b) by 429 days.

(21) Appl. No.: 18/266,157

(22) PCT Filed: Dec. 1, 2021

(86) PCT No.: PCT/EP2021/083828
§ 371 (c)(1),
(2) Date: Jun. 8, 2023

(87) PCT Pub. No.: WO2022/122513
PCT Pub. Date: Jun. 16, 2022

(65) Prior Publication Data
US 2024/0044387 A1 Feb. 8, 2024

(30) Foreign Application Priority Data
Dec. 10, 2020 (FR) ..................................... 2013019

(51) Int. Cl.
*F16D 65/847* (2006.01)
*B60B 21/08* (2006.01)
(Continued)

(52) U.S. Cl.
CPC ............ *F16D 65/847* (2013.01); *B60B 21/08* (2013.01); *B60B 27/0052* (2013.01);
(Continued)

(58) Field of Classification Search
CPC . B60B 19/10; B60B 2900/513; F16D 65/847; F16D 65/853; F28F 2255/10
See application file for complete search history.

(56) References Cited

U.S. PATENT DOCUMENTS 4,130,187 A * 12/1978 Midolo ................. F16D 65/853
188/71.6
2004/0262096 A1* 12/2004 Hageman .............. F16D 65/847
188/71.6
(Continued)

FOREIGN PATENT DOCUMENTS

DE 37 36 508 A1 1/1989
DE 202017003725 U1 * 8/2017 ............... F24H 1/40
(Continued)

OTHER PUBLICATIONS

International Search Report of PCT/EP2021/083828 dated Mar. 25, 2022 [PCT/ISA/210].

*Primary Examiner* — S. Joseph Morano
*Assistant Examiner* — Alex Palmer
(74) *Attorney, Agent, or Firm* — Sughrue Mion, PLLC

(57) ABSTRACT

An aircraft wheel including a rim fitted with rotor disks driven in rotation with the rim by first splines secured to the rim and engaged in notches in the rotor disks, stator disks interposed between the rotor disks and provided with notches engaged on second splines secured to a brake torque tube arranged to be fastened to an axle carrying the aircraft wheel, one or more heatpipe extending in one or more of the first and second splines parallel to a plane containing an axis of rotation of the wheel, the heatpipe having an end projecting outside the aircraft wheel, and one or more heatsinks secured to the end of the heatpipe.

13 Claims, 3 Drawing Sheets

(51) Int. Cl.

| | | |
|---|---|---|
| B60B 27/00 | (2006.01) | |
| F16D 55/36 | (2006.01) | |
| F16D 65/78 | (2006.01) | |
| F16D 65/853 | (2006.01) | |

(52) U.S. Cl.
CPC ...... *F16D 65/853* (2013.01); *B60B 2900/513* (2013.01); *F16D 55/36* (2013.01); *F16D 2065/784* (2013.01); *F16D 2065/789* (2013.01)

(56) References Cited

U.S. PATENT DOCUMENTS

| | | | |
|---|---|---|---|
| 2018/0058777 A1* | 3/2018 | Anderson | F28F 1/025 |
| 2018/0216684 A1* | 8/2018 | Gruss | F16D 65/847 |
| 2022/0135008 A1* | 5/2022 | Ke | B64C 25/42 |
| | | | 188/264 R |

FOREIGN PATENT DOCUMENTS

| | | | | |
|---|---|---|---|---|
| GB | 1 413 520 A | 11/1975 | | |
| KR | 100539144 B1 * | 12/2005 | | B60C 23/19 |
| WO | WO-2012081822 A1 * | 6/2012 | | B60T 17/227 |
| WO | 2016/177844 A1 | 11/2016 | | |

* cited by examiner

BRAKED AIRCRAFT WHEEL

CROSS REFERENCE TO RELATED APPLICATIONS

This application is a National Stage of International Application No. PCT/EP2021/083828, filed Dec. 1, 2021, claiming priority to French Patent Application No. 2013019, filed Dec. 10, 2020, the contents of each of which being herein incorporated by reference in their entireties.

The present invention relates to the field of aviation, and more particularly to cooling brakes fitted to aircraft wheels.

BACKGROUND OF THE INVENTION

An aircraft undercarriage generally comprises a leg having a first end connected to a structure of the aircraft and a second end provided with a shaft or axle with a wheel mounted to rotate thereon. The wheel comprises a rim connected by a web to a hub that receives the shaft of the leg and that co-operates with the rim to define a space in which there is placed a stack of disks made up of alternating stator disks that are stationary relative to the shaft and rotor disks that are stationary relative to the rim. An actuator, e.g. a hydraulic cylinder, is arranged to exert a compression force on the stack of disks via a hydraulic ring. The rim has two annular flanges or "beads" between which a tire is mounted.

Each time the pilot of an aircraft applies the brakes, there is a rise in the temperature of the aircraft brake disks and of their immediate surroundings. Safety considerations impose maximum temperature limits, for example:

- 204° C. for the beads of the rims in order to preserve the tires and protect personnel working in the vicinity of the wheels; and
- 120° C. for the hydraulic ring in order to avoid decomposing the hydraulic fluid into acidic sulfur compounds that are harmful to the hydraulic circuit.

Furthermore, these same safety considerations mean that the aircraft is not permitted to take off if the temperature of the disks of a brake is higher than 400° C. This limit can have a direct impact on the turnaround time (TAT) of the aircraft, since the pilot must necessarily wait for the temperature of the brake disks to drop below this threshold before taking off.

Various methods have been proposed for accelerating the cooling of brake disks and their immediate surroundings. It is thus known to place an electric fan at the end of the axle so as to create a stream of air around the brake disks. Nevertheless, it is difficult to organize an effective stream of air between the rim and the disks, and too great a stream runs the risk of oxidizing disks made of carbon. Furthermore, the fan generates noise and it needs to be dismantled each time the wheel is manipulated (changing the tire, the brake disks, . . . ), thus leading to additional maintenance operations and costs.

Proposals have also been made to fit the brake, or the wheel, with cooling fins in order to dissipate the heat generated during braking. Nevertheless, that method does not enable disk cooling time to be reduced significantly since the fins are not located on the hottest parts, and constraints concerning installation space put a limit on the surface areas available for heat exchange between the fins and ambient air.

OBJECT OF THE INVENTION

An object of the invention is thus to improve the cooling of brake disks.

SUMMARY OF THE INVENTION

To this end, the invention provides an aircraft wheel comprising a rim fitted with rotor disks driven in rotation with the rim by means of first splines secured to the rim and engaged in notches in the rotor disks, stator disks being interposed between the rotor disks and being provided with notches engaged on second splines secured to a brake torque tube arranged to be fastened to an axle carrying the wheel.

According to the invention, the wheel includes at least one sintered heatpipe extending in at least one of the first and second splines parallel to a plane containing the axis of rotation of the wheel, the heatpipe having an end projecting outside the wheel, and at least one heatsink secured to said end of the heatpipe.

Installing such heatpipes serves to pick up the heat transmitted by the disks to the wheel and/or to the torque tube, and thus to convey the heat for it to be dissipated in ambient air, thereby shortening turnaround time and reducing the risk of damaging the tire.

In particular manner, the first splines are integral with the wheel.

In particular manner, the first splines are bars fitted to the wheel.

According to a particular characteristic of the invention, the heatpipe is tubular in shape and is implanted in a bore made in the spline.

In particular manner, the heatpipe is held in the spline by hydroforming.

In particular manner, a thermally conductive material is deposited between the heatpipe and the spline.

According to another particular characteristic of the invention, the heatsink comprises fins imparting an increased free surface area to the end of the heatpipe.

In particular manner, the fins are fastened to the heatpipe by hydroforming.

According to another particular characteristic of the invention, the heatpipe extends parallel to the axis of rotation of the wheel.

According to another particular characteristic of the invention, the heatpipe slopes a little relative to the axis of rotation of the wheel, the end of the heatpipe that projects from the spline being further from said axis of rotation than the portion of the heatpipe held in the spline, and the heatpipe and the axis of rotation of the wheel forming between them an angle that is less than or equal to the angle defined by said axis of rotation and an outer wall of the rim for receiving a tire.

The invention also provides an aircraft undercarriage including at least one such wheel.

The invention also provides an aircraft including at least one such undercarriage.

BRIEF DESCRIPTION OF THE DRAWINGS

The invention can be better understood in the light of the following description, which is purely illustrative and non-limiting, and which should be read with reference to the accompanying drawings, in which.

DETAILED DESCRIPTION OF THE INVENTION

Figure 1:
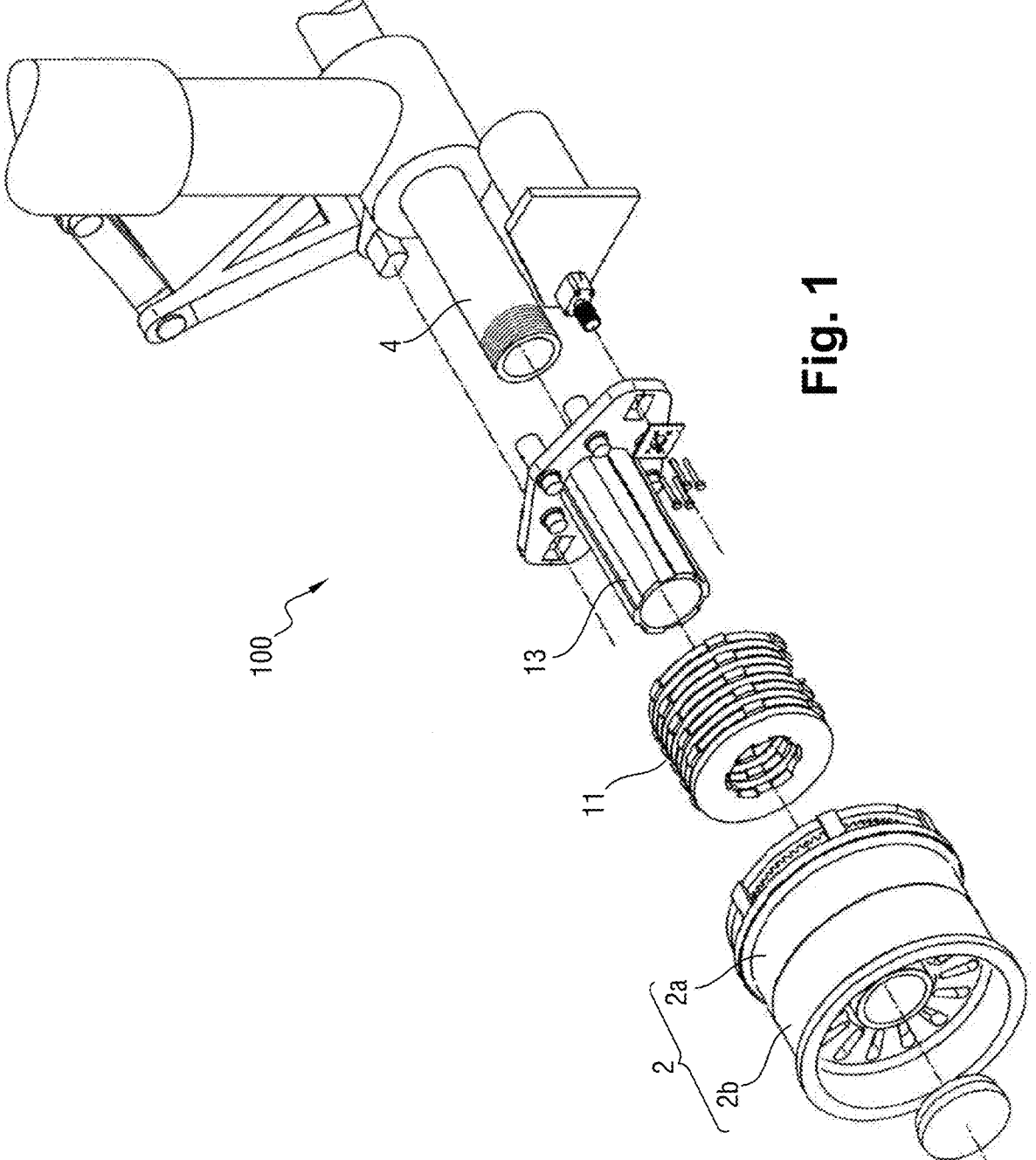
FIG. 1 is an exploded diagrammatic view of an aircraft undercarriage fitted with a wheel (its tire is omitted for greater clarity)
Figure 2:
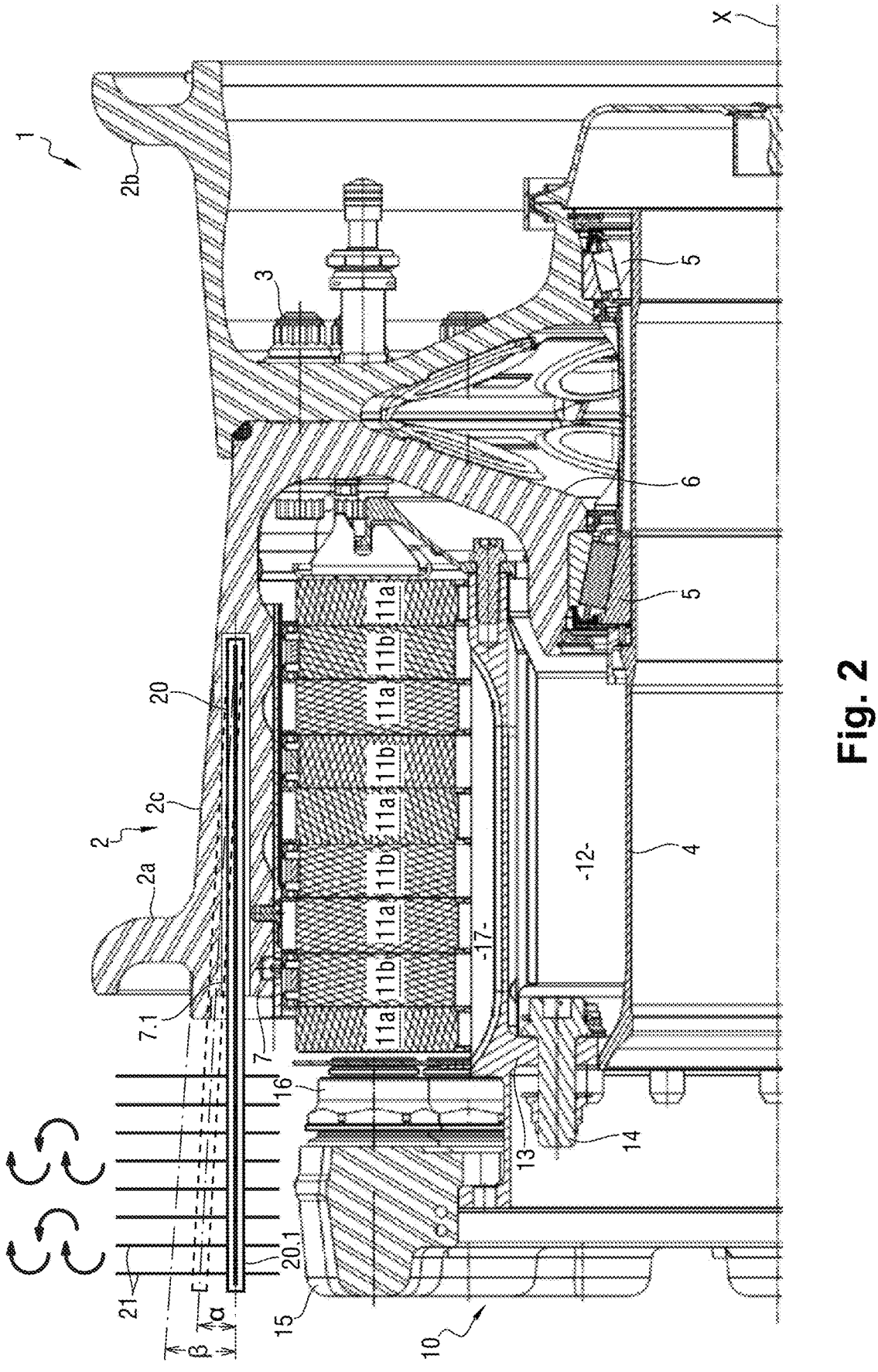
FIG. 2 is an axial section view of a wheel of the invention mounted on an axle of the aircraft undercarriage shown in FIG. 1.

With reference to FIGS. 1 and 2, the invention applies to an aircraft having main undercarriages, each comprising a leg 100 with a first end hinged to a structure of the aircraft and a second end provided with an axle 4 and thus forming an axle support. Each axle 4 is provided with a wheel 1 comprising a rim 2 connected by a web to a hub 6 that is mounted to rotate on the axle 4 about an axis X by means of bearings 5 carried by the hub 6. In this example, the rim 2 is made up of two half-rims 2a and 2b that are assembled together by bolts 3, and each of which includes a bead in such a manner that a tire can be held captive between the beads.

The wheel 1 is fitted with a brake 10 comprising disks 11 that are received in an annular space defined between the half-rim 2a and the hub 6. The stack of disks 11 is threaded onto a torque tube 13 that is fastened to the axle support by bolts, and it is made up of stator disks 11a and rotor disks 11b. The brake 10 includes a support 15 for brake actuators 16 adapted to act selectively to apply a braking force on the stack of disks 11. In this example, the brake actuators 16 are hydraulic pistons.

Each rotor disk 11b has an outer periphery provided with notches, each having engaged therein a respective first spline 7 made integrally with the half-rim 2a in order to constrain the rotor disks 11b in rotation with the half-rim 2a. Each stator disk 11a has an inner periphery provided with notches, each receiving a respective second spline 17 secured to the torque tube 13. This is all well known, and is recalled merely to situate the invention.

In the particular embodiment of the invention shown in FIG. 1, each of the first splines 7 of the rim 2 includes a non-through bore 7.1 arranged to extend lengthwise in each first spline 7. A respective sintered heatpipe 20 of tubular shape is implanted in each of the bores 7.1. The heat pipe 20 extends parallel to the axis of rotation of the wheel facing the edges of each of the disks 11, and only one end 20.1 of the heatpipe 20 projects out from the bore 7.1 and the half-rim 2a.

In this example the heatpipe 20 is held in position in the spline 7 by hydroforming (which may be hot or cold). Thus, after being inserted in the spline 7, the heatpipe 20 is deformed plastically and the shape of the heatpipe 20 is locally determined by the bore 7.1, which acts as a mold. Close contact is thus ensured between the outside surface of the heatpipe 20 and the wall of the bore 7.1.

Contact resistance between the heatpipe 20 and the bore 7.1 in the spline 7 can be reduced to a great extent by depositing a thermally conductive material between the heatpipe 20 and the walls of the spline 7 defining the bore 7.1, which material may be thermal adhesive, thermal paste, or a metal that presents thermal expansion at low temperature. It can be understood that this improves contact between the outside surface of the heatpipe 20 and the wall of the bore 7.1, thereby enhancing the transfer of heat between them by conduction.

A plurality of fins 21 are placed at the end 20.1 of the heatpipe 20, with each fin lying in a plane orthogonal to the axis of rotation of the wheel 1. In this example, the fins 21 are spaced from one another at regular intervals and they constitute a heatsink imparting an increased free surface area to the end 20.1 of the heatpipe 20.

In this example, the fins 21 are fastened to the heatpipes 20 by hydroforming after they have been threaded onto the end portions 20.1 of the heatpipes 20. Thus, the end portion 20.1 of each heatpipe 20 is plastically deformed, and its diameter is locally determined by the diameters of the orifices through which the fins 21 are inserted. Contact is thus enhanced between the outside surfaces of the heatpipes 20 and the fins 21, encouraging heat transfer between them by conduction.

Figure 3:
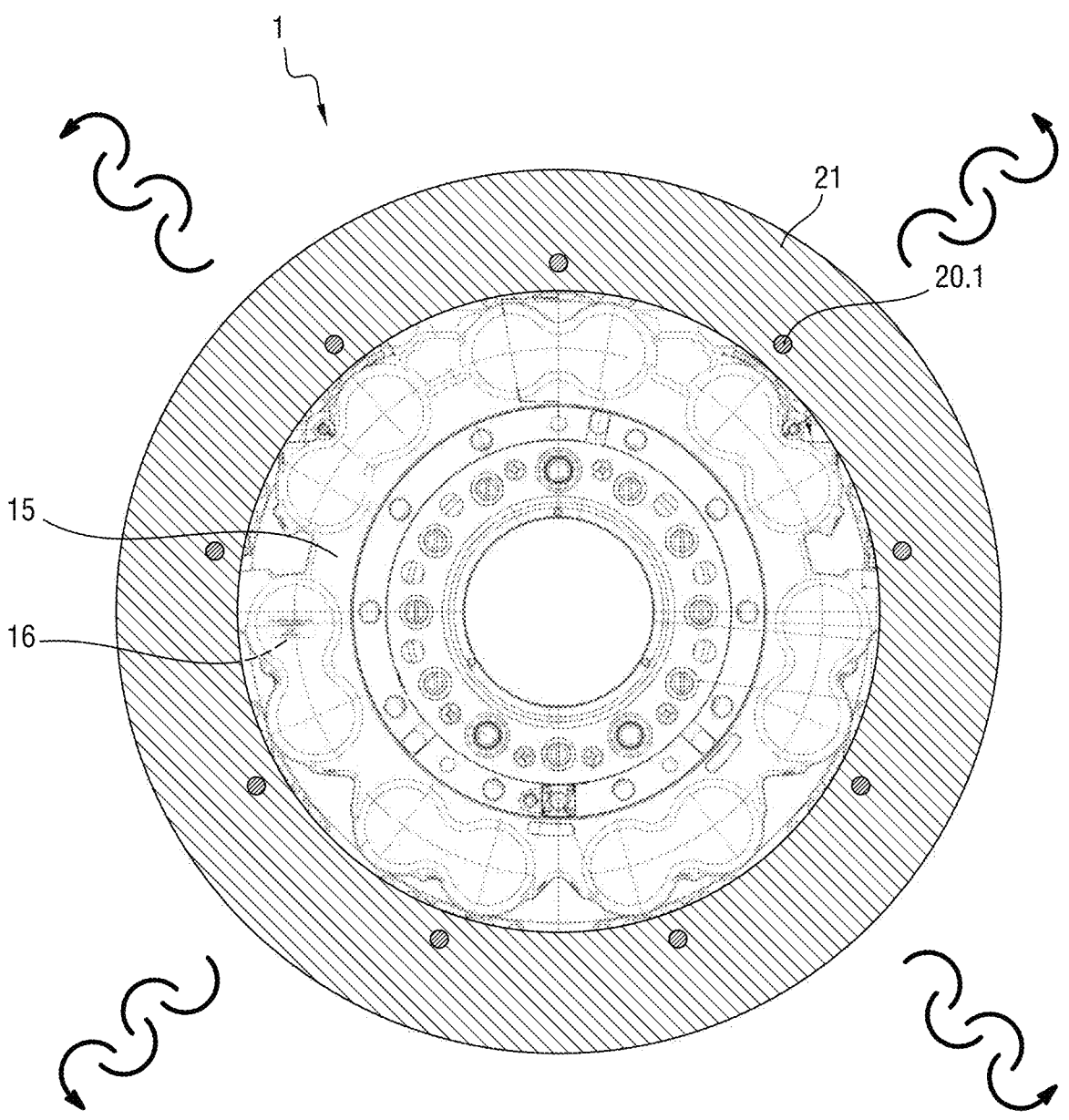
FIG. 3 is a fragmentary face view of the wheel shown in FIG. 2.

It is important that the fins 21 do not impede rotation of the wheel 1, and that they do not impede operation of the brake 10 or of its brake actuators 16. Consequently, the fins 21 must extend in such a manner as to leave sufficient clearance relative to the brake 10 and the rim 2. In this example, the fins 21 are annular in shape and they extend around the actuator support 15 (FIG. 3).

The heatpipes 20 fitted with fins 21 serve to pick up the heat transmitted by the disks 11 to the half-rim 2a, and to convey that heat to the fins 21 for dissipation by convection in ambient air. Placing the heatpipes in the splines 7 has the advantage of picking up the heat as close as possible to the disks 11 and thus of limiting the diffusion of heat into the rim 2, thereby shortening turnaround time and reducing the risk of tire damage.

It is clear that the heatpipes 20 extend substantially horizontally when the undercarriage is in the extended position. Using sintered heatpipes means that gravity can be ignored since such heatpipes operate in any position relative to gravity, and in particular when they are horizontal, as are the heatpipes 20.

It should be observed that it is simple to fit the heatpipes 20 in the splines 7 of the rim 2, that they operate in a manner that is entirely passive, and thus reliable, and that they can be retrofitted to existing brakes.

Naturally, the invention is not limited to the embodiment described, but covers any variant coming within the ambit of the invention as defined by the claims.

Although above, the splines 7 are integral with the half-rim 2a, the splines 7 could equally well be bars that are fitted to the half-rim 2a and that have the heatpipes 20 in place therein.

Although above, the heatpipes 20 are installed in splines that are secured to the half-rim 2a, they could equally well be installed in the splines 17 secured to the torque tube 13 (or in bars fitted to the torque tube 13) in order to pick up heat from the disks 11 and limit heat diffusion into said torque tube 13.

Although above, all of the splines 7 are provided with respective heatpipes 20, it is possible for only some of the splines 7 to receive a respective heatpipe 20.

Although above, the ends 20.1 of the heatpipes 20 are provided with fins 21, it is possible to use heatsinks of other types for dissipating the heat picked up by a heatpipe 20.

The number of fins 21 and their shapes could be different from what is shown in FIG. 1.

Although above, the heatpipes 20 are installed horizontally, they could equally well slope a little so as to form a non-zero angle $\alpha$ with the axis of rotation X of the rim 2 so as to facilitate their operation with respect to gravity. In particular, the heatpipes 20 may be arranged conically. The projecting ends 20.1 of the heatpipes 20 would thus be further away from the axis X than the portions of the heatpipes 20 held in the splines 7. In particular, the angle $\alpha$ could be substantially less than or equal to the angle $\beta$ formed between the axis X and the outer wall 2c of the half-rim 2a receiving the tire.

The heat conveying fluids suitable for use in the heatpipes 20 are well known to the person skilled in the art, and they depend on the operating temperature range. Although water is suitable in this situation for cooling a brake fitted to an aircraft wheel, it is possible to use other fluids, in particular fluids that present better heat capacity and/or that correspond to the operating temperature range of an aircraft brake.

Although above, the ends 20.1 of the heatpipes 20 project from the half-rim 2*a*, the bores 7.1 could also be arranged so that the ends of the heatpipes carrying the fins project from the half-rim 2*b*, in particular when the rim is a one-piece rim. The fins would then be arranged inside the half-rim 2*b*.

Although above, the heatpipes 20 are held in position in the splines 7 by hydroforming, it is possible to use other types of fastening (adhesive, bolts, additive manufacture, . . . ).

The invention claimed is:

1. An aircraft wheel comprising:
a rim connected by a web to a hub and fitted with rotor disks driven in rotation with the rim by first splines secured to the rim and engaged in notches in the rotor disks;
stator disks interposed between the rotor disks and provided with notches engaged on second splines secured to a brake torque tube arranged to be fastened to an axle carrying the aircraft wheel, the rotor disks and the stator disks being received in an annular space defined between the rim and the hub;
at least one heatpipe extending in at least one of the first and second splines and in a plane containing an axis of rotation of the aircraft wheel, the at least one heatpipe having an end projecting outside the aircraft wheel; and
at least one heatsink secured to said end of the at least one heatpipe,
wherein the at least one heatpipe extends in the annular space without ever crossing the web.

2. The aircraft wheel according to claim 1, wherein the first splines are integral with the aircraft wheel.

3. The aircraft wheel according to claim 1, wherein the first splines are bars fitted to the aircraft wheel.

4. The aircraft wheel according to claim 1, wherein the at least one heatpipe is tubular in shape and is implanted in a bore made in the first spline.

5. The aircraft wheel according to claim 4, wherein the at least one heatpipe is held in the first spline by hydroforming.

6. The aircraft wheel according to claim 5, wherein a thermally conductive material is deposited between the at least one heatpipe and the first spline.

7. The aircraft wheel according to claim 1, wherein the at least one heatsink comprises fins imparting an increased free surface area to the end of the at least one heatpipe.

8. The aircraft wheel according to claim 7, wherein the fins are fastened to the at least one heatpipe by hydroforming.

9. The aircraft wheel according to claim 1, wherein the at least one heatpipe extends parallel to the axis of rotation of the aircraft wheel.

10. The aircraft wheel according to claim 1, wherein the at least one heatpipe slopes relative to the axis of rotation of the aircraft wheel, the end of the at least one heatpipe being farther from said axis of rotation than a portion of the at least one heatpipe held in the at least one of the first and second splines, and the at least one heatpipe and the axis of rotation of the aircraft wheel forming therebetween an angle that is less than or equal to an angle defined by said axis of rotation and an outer wall of the rim.

11. An aircraft undercarriage including at least one of the aircraft wheel according to claim 1.

12. An aircraft including at least one of the aircraft undercarriage according to claim 11.

13. The aircraft wheel according to claim 1, wherein the at least one heatpipe is a sintered heatpipe.

* * * * *